(12) United States Patent
Kwon

(10) Patent No.: US 11,336,879 B2
(45) Date of Patent: May 17, 2022

(54) DISPLAY APPARATUS AND CONTROLLING METHOD THEREOF

(71) Applicant: SAMSUNG ELECTRONICS CO., LTD., Suwon-si (KR)

(72) Inventor: Oh Yun Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/770,874

(22) PCT Filed: Nov. 23, 2018

(86) PCT No.: PCT/KR2018/014564
§ 371 (c)(1),
(2) Date: Jun. 8, 2020

(87) PCT Pub. No.: WO2019/112218
PCT Pub. Date: Jun. 13, 2019

(65) Prior Publication Data
US 2020/0336716 A1 Oct. 22, 2020

(30) Foreign Application Priority Data
Dec. 8, 2017 (KR) .................. 10-2017-0167912

(51) Int. Cl.
*H04N 9/64* (2006.01)
*H04N 5/05* (2006.01)
(52) U.S. Cl.
CPC .............. *H04N 9/64* (2013.01); *H04N 5/05* (2013.01)

(58) Field of Classification Search
CPC .. H04N 9/64; H04N 5/05; H04N 5/14; H04N 21/426; G09G 2310/024;
(Continued)

(56) References Cited

U.S. PATENT DOCUMENTS 4,574,279 A * 3/1986 Roberts .................. G09G 1/167
345/25
6,404,459 B1 * 6/2002 Kitou ..................... G09G 1/167
345/698
(Continued)

FOREIGN PATENT DOCUMENTS

CN 1773331 A 5/2006
EP 1024663 A2 8/2000
(Continued)

OTHER PUBLICATIONS

International Search Report (PCT/ISA/210) dated Mar. 26, 2019 by the International; Searching Authority in counterpart International Patent Application No. PCT/KR2018/014564.
(Continued)

*Primary Examiner* — Michael Lee
(74) *Attorney, Agent, or Firm* — Sughrue Mion, PLLC

(57) ABSTRACT

A display apparatus includes a display panel on which an image is displayed, a receiver configured to receive an image signal related to the image from an external device and a controller configured to change an image processing mode of the image based on a change in a vertical frequency of the image signal. The display apparatus according to an embodiment has an effect of providing a more vivid image to a user by changing the image processing mode of the image based on the change in the vertical frequency of the image signal received from the external device.

17 Claims, 19 Drawing Sheets

(58) Field of Classification Search
CPC ... G09G 2320/0606; G09G 2320/0666; G09G 2354/00; G09G 5/005; G09G 5/006
USPC .......................................................... 348/547
See application file for complete search history.

(56) References Cited

U.S. PATENT DOCUMENTS

| | | | |
|---|---|---|---|
| 9,589,540 | B2 | 3/2017 | Wu et al. |
| 2004/0021625 | A1* | 2/2004 | Lee ................ G09G 3/3614 345/87 |
| 2004/0104926 | A1* | 6/2004 | Murray ............. G06F 3/0481 715/719 |
| 2007/0273787 | A1* | 11/2007 | Ogino ............... H04N 7/015 348/441 |
| 2008/0231745 | A1* | 9/2008 | Ogino ............... H04N 5/145 348/441 |
| 2010/0039557 | A1* | 2/2010 | Mori ................. H04N 5/145 348/459 |
| 2010/0188425 | A1* | 7/2010 | Mizuguchi ......... H04N 7/0122 345/660 |
| 2011/0157467 | A1 | 6/2011 | McRae |
| 2013/0002957 | A1* | 1/2013 | Deng ................ H04N 7/012 348/584 |
| 2013/0141642 | A1 | 6/2013 | Wu et al. |
| 2014/0245149 | A1* | 8/2014 | Hill .................. G06F 3/0484 715/719 |
| 2017/0118443 | A1* | 4/2017 | Kim .................. G09G 5/12 |
| 2017/0193971 | A1* | 7/2017 | Bi .................... G09G 5/12 |
| 2017/0263201 | A1* | 9/2017 | Sato ................. G09G 3/3648 |
| 2018/0233075 | A1* | 8/2018 | Boyd ................ H04L 65/604 |
| 2019/0028766 | A1* | 1/2019 | Wold ................ H04N 21/4665 |

FOREIGN PATENT DOCUMENTS

| | | |
|---|---|---|
| EP | 2124437 A1 | 11/2009 |
| KR | 10-0219145 B1 | 9/1999 |
| KR | 10-2003-0082112 A | 10/2003 |
| KR | 10-2005-0080526 A | 8/2005 |
| KR | 10-2006-0081815 A | 7/2006 |
| KR | 10-2011-0087002 A | 8/2011 |

OTHER PUBLICATIONS

Written Opinion (PCT/ISA/237) dated Mar. 26, 2019 by the International; Searching Authority in counterpart International Patent Application No. PCT/KR2018/014564.
Communication dated Nov. 2, 2020, from the European Patent Office in counterpart European Application No. 18884912.9.
Rob Tobias et al. "Presentation on HDMI 2.1" Digital Video Broadcasting, retrieved from [https://www.dvb.org/resources/restricted/members/documents/ TM/TM5518_Presentation-on-HDMI-21.pdf], Aug. 16, 2017, (40 pages total) XP017853691.
Communication dated Jul. 27, 2021 issued by the European Intellectual Property Office in counterpart European Application No. 18 884 912.9.
Communication dated Sep. 15, 2021 by the Korean Intellectual Property Office in Korean Patent Application No. 10-2017-0167912.
Communication dated Mar. 30, 2022 issued by the Korean Intellectual Property Office in counterpart Korean Application No. 10-2017-0167912.

* cited by examiner

DISPLAY APPARATUS AND CONTROLLING METHOD THEREOF

TECHNICAL FIELD

The disclosure relates to a display apparatus and a controlling method thereof, and more specifically to a technology that analyzes characteristics and types of images received from an external device and provides a more optimized image to a user based on the analyzed characteristics and types of images.

BACKGROUND ART

In modern society, as interest in displays increases, various technologies for improving the performance of the displays have been developed.

In place of a cathode ray tube (CRT), which has been used for many years since conventional television broadcasting began, a very thin television receiver such as a liquid crystal display (LCD) or a plasma display panel (PDP) has been developed and put into practical use.

In particular, a color liquid crystal display apparatus using a color liquid crystal display panel can be driven with low power consumption, and is one of the display apparatuses that can be expected to further develop in the future as large-size color liquid crystal display panels become cheaper.

In addition, as technology for digital display apparatuses has been developed and commercialized, various types of content such as Contents on Demand and movies can be provided through external devices such as PCs and game consoles in addition to broadcasts received in real time.

However, when content received from a content provider through the external device is played through the display apparatus, since the format and playback method of the content provided vary, it is needed to play the content appropriately.

That is, in order to play an image with image quality optimized for the received content, the image quality needs to set according to the characteristics of the content and the function of the display apparatus being played. In the case of the prior art, there was an inconvenience in that a user had to change the setting of the image quality or sound quality.

In addition, when the user directly changes the setting of image quality or sound quality, the method is complicated and difficult, and the user often gives up halfway.

DISCLOSURE

Technical Problem

Therefore, a display apparatus according to an embodiment is designed to solve the above-described problems. One aspect provides a display apparatus capable of providing a more optimized image to a user by analyzing the characteristics and types of the images received from an external device and changing an image processing mode of the played image based on the analysis.

Technical Solution

In accordance with an aspect of the disclosure, a display apparatus comprises a display panel on which an image is displayed; a receiver configured to receive an image signal related to the image from an external device; and a controller configured to change an image processing mode of the image based on a change in a vertical frequency of the image signal.

The controller may change the image processing mode corresponding to the change in the vertical frequency when a change per hour of the vertical frequency is outside a preset range.

The controller may change the image processing mode of the image differently according to the amount of change per hour of the vertical frequency.

The controller may change the image processing mode of the image based on variable refresh rate (VRR) information when the image includes the VRR information.

The controller may change the image processing mode of the image based on at least one of color information of the image and genre information of the image.

The genre information may include at least one of a game genre, a movie genre, a drama genre, and a news genre.

The controller may change the image processing mode of the image in a way of changing a setting mode of the image, and the setting mode includes at least one of information regarding brightness, color, sharpness, contrast, blurring, and unevenness of the image.

The controller may perform an image process by applying at least one of a delay prevention function, a motion blur removal function, and a high dynamic range (HDR) function when the image processing mode is changed based on the game genre.

The controller may perform an image process by applying at least one of a contrast function, a sharpness function, an HDR function, and a De-Judder function of the image when the image processing mode is changed based on the movie genre.

The controller may display a list of settings applied to the changed image processing mode on the display panel after the image processing mode of the image is changed.

The controller may display a screen on which a user can cancel part of the list of settings on the display panel.

The controller, after changing the image processing mode of the image, when a change per hour of the vertical frequency is included in a preset range, may change to a playback mode before changing the image processing mode of the image.

The controller may display the change information of the vertical frequency on the display panel.

In accordance with an aspect of the disclosure, a controlling method of a display apparatus includes: receiving an image signal from an external device; and changing an image processing mode of the image displayed on a display panel based on a change of a vertical frequency of an image signal.

The changing the image processing mode may include: changing the image processing mode corresponding to the change in the vertical frequency when a change per hour of the vertical frequency is outside a preset range.

Advantageous Effects

According to a display apparatus and a control method thereof, it is possible to provide an optimized image to a user by changing an image processing mode of an image played based on a change in a vertical frequency of an image signal received from an external device.

MODE FOR INVENTION

Figure 1:
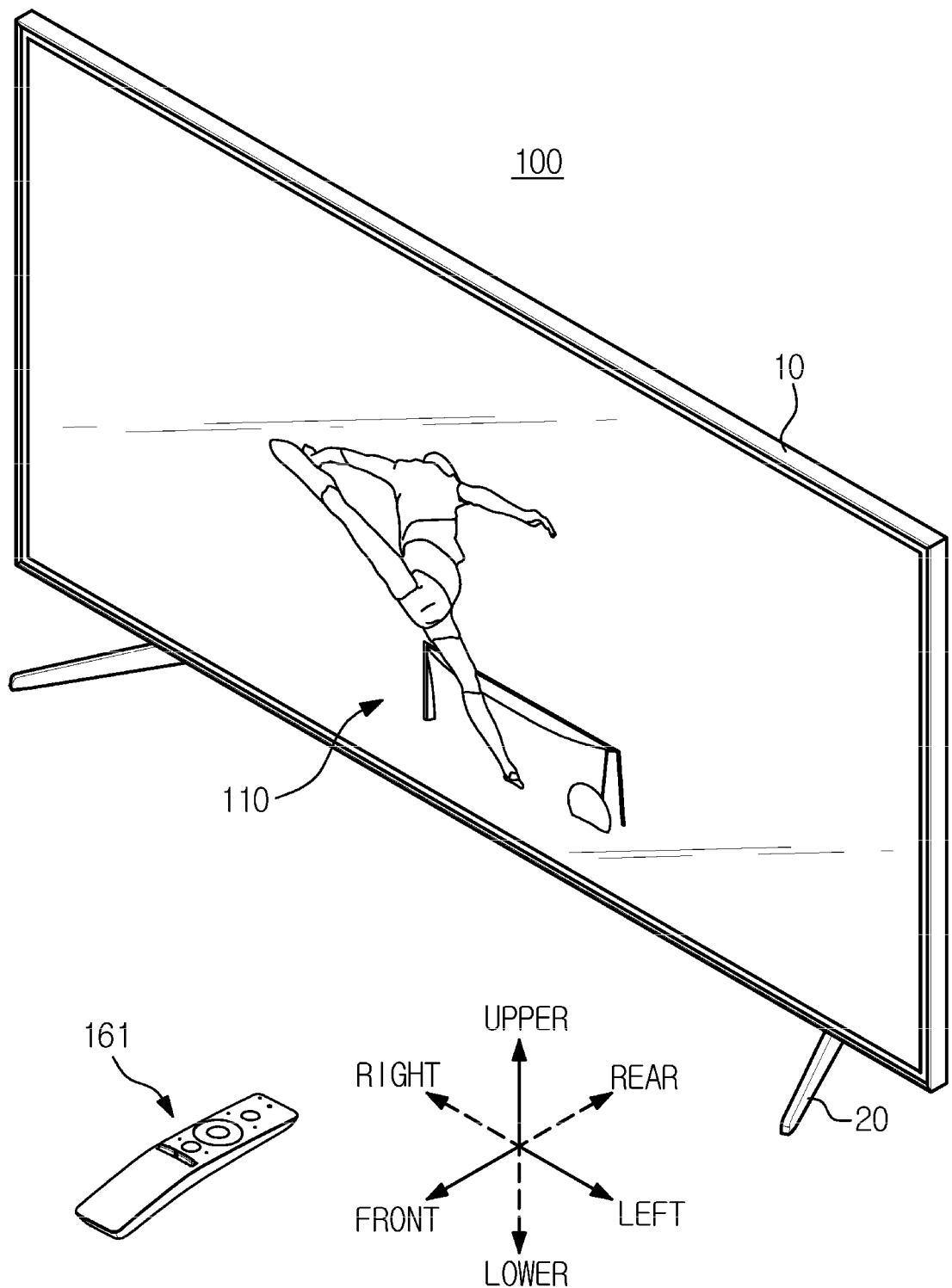
FIG. 1 is a view illustrating an appearance of a display apparatus according to an embodiment of the present disclosure.

The embodiments illustrated in the specification and the configuration illustrated in the drawings are preferred examples of the disclosure, and at the time of filing the present application, there may be various modifications that can replace the embodiments and drawings of the present specification.

In addition, the terms used herein are used to describe the embodiments, and are not intended to limit and/or restrict the disclosure. Singular expressions include plural expressions unless the context clearly indicates otherwise.

In the present specification, terms such as 'include,' 'have' and 'comprise' are intended to designate the presence of features, numbers, steps, operations, configurations, or combinations thereof, or one or more other features described in the specification. It does not preclude any possibility of the existence or addition of fields or numbers, steps, actions, components, parts or combinations thereof.

The terms first, second, etc. are used to distinguish one component from another component, and the component is not limited by the terms described above. The terms are used only for the purpose of distinguishing one component from other components. For example, a first component may be referred to as a second component without departing from the scope of the present invention, and similarly, a second component may be referred to as a first component. The term "and/or" includes a combination of a plurality of related described items or any one of a plurality of related described items.

Hereinafter, embodiments of the present disclosure will be described with reference to the accompanying drawings.

FIG. 1 is a view illustrating an appearance of a display apparatus according to an embodiment of the present disclosure.

Referring to FIG. 1, a display apparatus 100 may include a display panel 110 displaying an image and a frame 10 disposed behind the display panel 110 to support the display panel 110.

The display apparatus 100 according to an embodiment refers to a device capable of outputting an image by processing an image signal previously stored in the display apparatus 100 or received from the outside.

For example, when the display apparatus 100 is a TV, a broadcast signal transmitted from a broadcasting station may be received and processed to output an image and sound included in the broadcast signal. Alternatively, it is also possible to receive video and audio signals from a set-top box.

In addition, the display apparatus 100 may be implemented in various forms such as a monitor, a portable multimedia device, a portable communication device, and a portable computing device, and if the display apparatus 100 is a device that visually displays an image, its form is not limited. However, in the following embodiments, for convenience of description, a case where the display apparatus 100 is a TV will be described as an example.

In addition, when the display apparatus 100 is implemented as a stand type as shown in FIG. 1, so that the display apparatus 100 can be stably placed on a horizontal surface, the display panel 110 and a stand 20 supporting the frame 10 may be provided at the bottom of the frame 10.

In addition, when the display apparatus 100 is implemented as a wall-mounted type, a structure such as a bracket is provided at the rear of the frame 10 so that the display apparatus 100 can be installed on a wall.

The display panel 110 may be in a flat state as shown in FIG. 1 according to the embodiment, and when the display panel 110 is bent, both right and left ends may protrude to form a curved surface having a constant curvature.

When the display apparatus 100 according to an embodiment displays an image received from an external device, for example, a device providing an image, such as a PC or a game console, the present disclosure relates to an apparatus for changing a reproduction mode of an image that is automatically reproduced according to the characteristics of the received image.

Hereinafter, in order to help facilitate understanding, in connection with an example in which the display apparatus 100 receives a video signal and an audio signal from various content sources, the display apparatus 100 will be mainly described as an example of receiving a video signal and an audio signal related to a game from various content sources.

Figure 2:
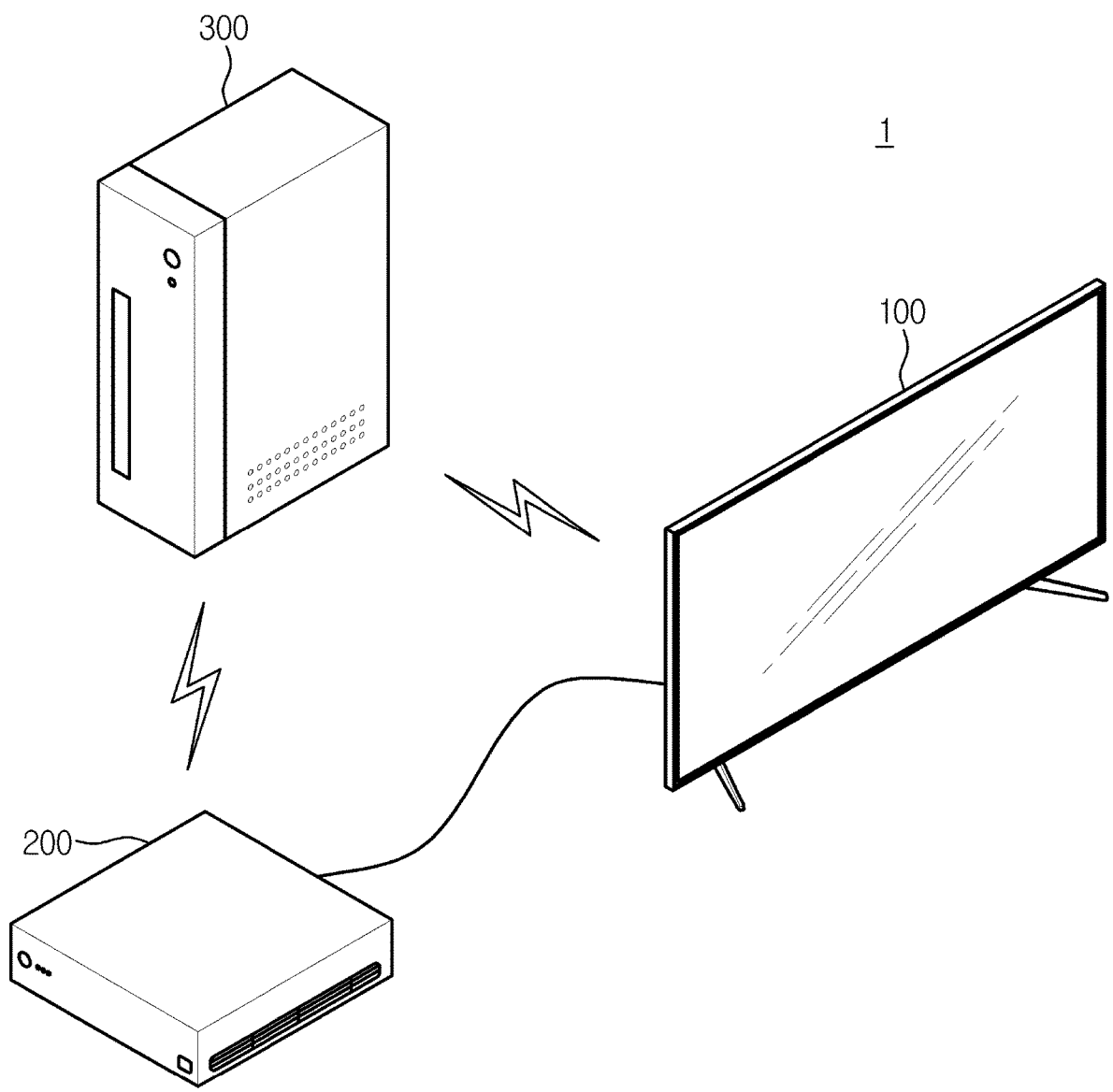
FIG. 2 is a view illustrating a state in which a display apparatus receives an image from an external device according to an embodiment.

FIG. 2 is a view illustrating a state in which a display apparatus receives an image from an external device according to an embodiment.

As shown in FIG. 2, the display apparatus 100 may generate an image and receive the image wirelessly or wired from stored external devices 200 and 300, and display the received image.

Specifically, the external device may refer to the image content providing apparatus 200 that outputs an image signal. The image content providing apparatus 200 may play video content stored thereon or receive video content from the external image source 300.

The name of the image content providing apparatus 200 is merely given for convenience in consideration of the operation of providing the image content in this embodiment. Therefore, the implementation form of the image content providing apparatus 200 is not limited. For example, it may be implemented in various forms such as an optical media playback device such as a DVD or Blu-ray player, a UHD player, a set-top box, a TV, a computer main body, a mobile device, a game console, and a home theater device.

In addition, as illustrated in FIG. 2, the display apparatus 100 may not receive image content only from the image content providing apparatus 200, but may also receive image content from the external image source 300. In this case, the display apparatus may receive an image from the external image source 300 using wireless communication.

In addition, various component parts for realizing the function of the display apparatus 100 may be provided inside the display apparatus 100. Hereinafter, a control block diagram of the display apparatus 100 will be described.

Figure 3:
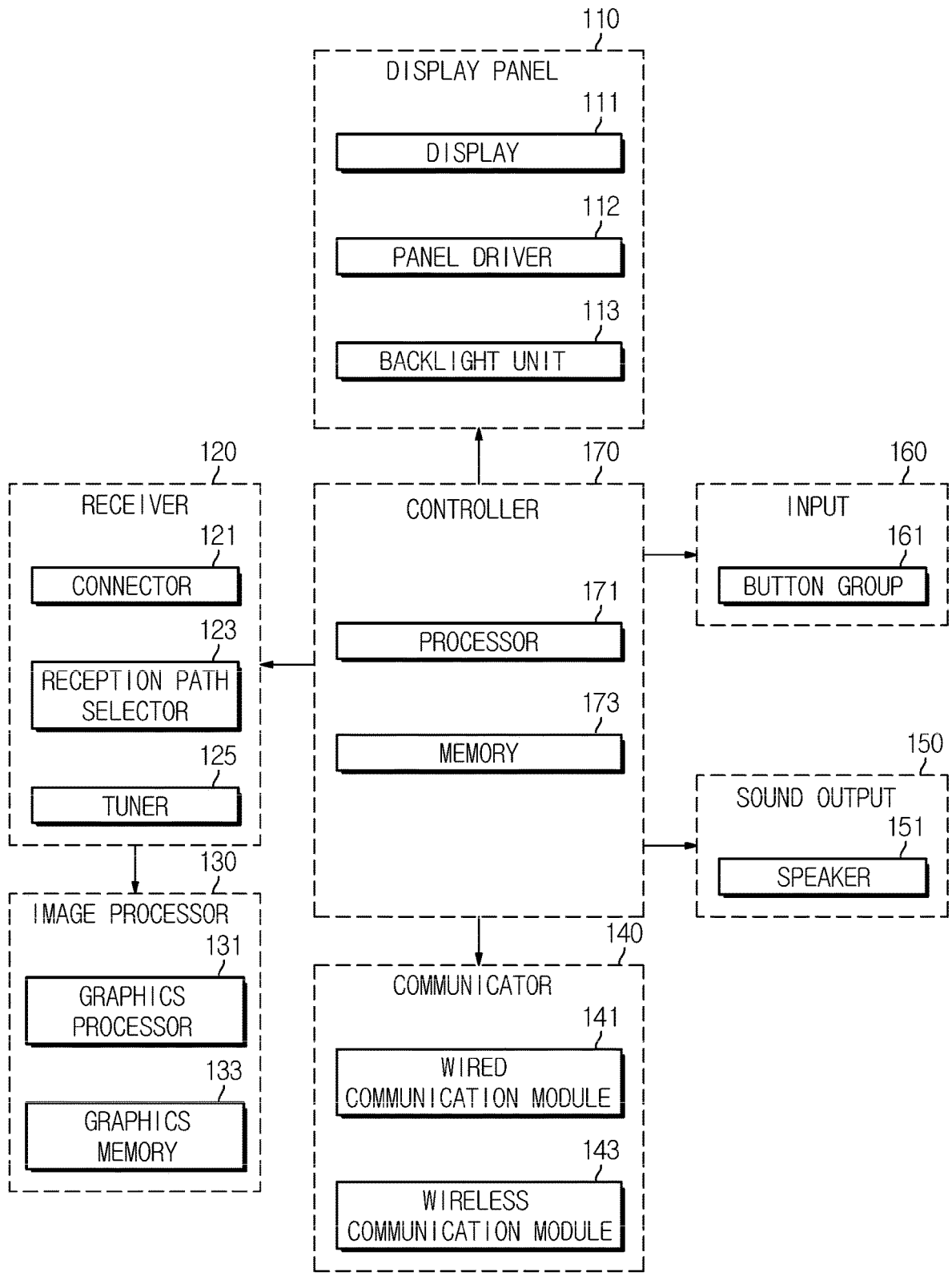
FIG. 3 is a block diagram illustrating some components of a display apparatus according to an embodiment.
Figure 4:
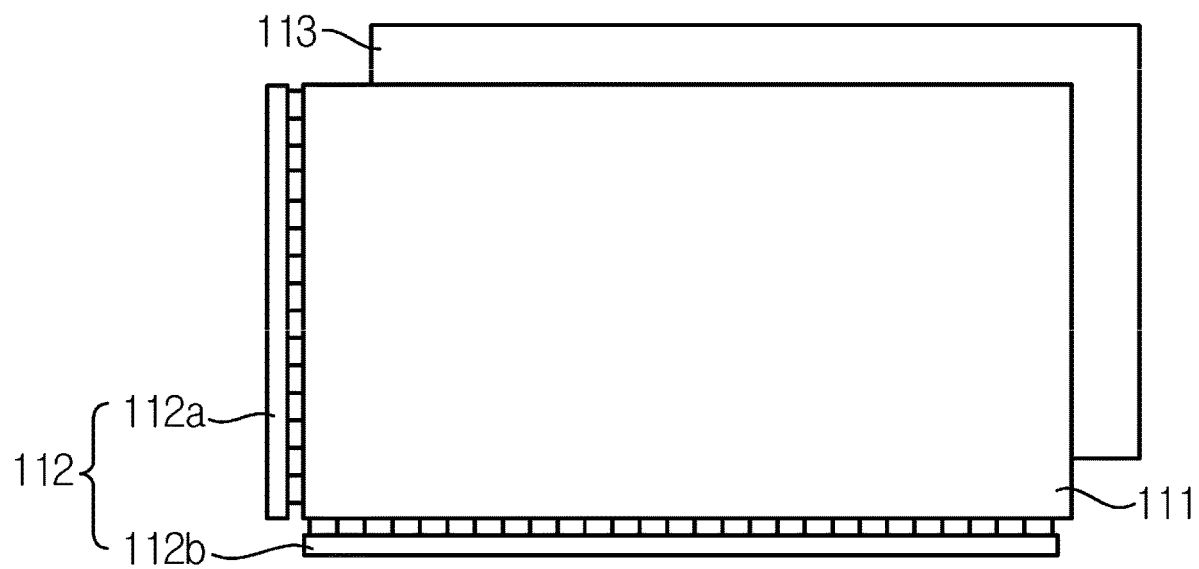
FIG. 4 is an exploded perspective view of an exploded configuration of a display panel according to an embodiment.
Figure 5:
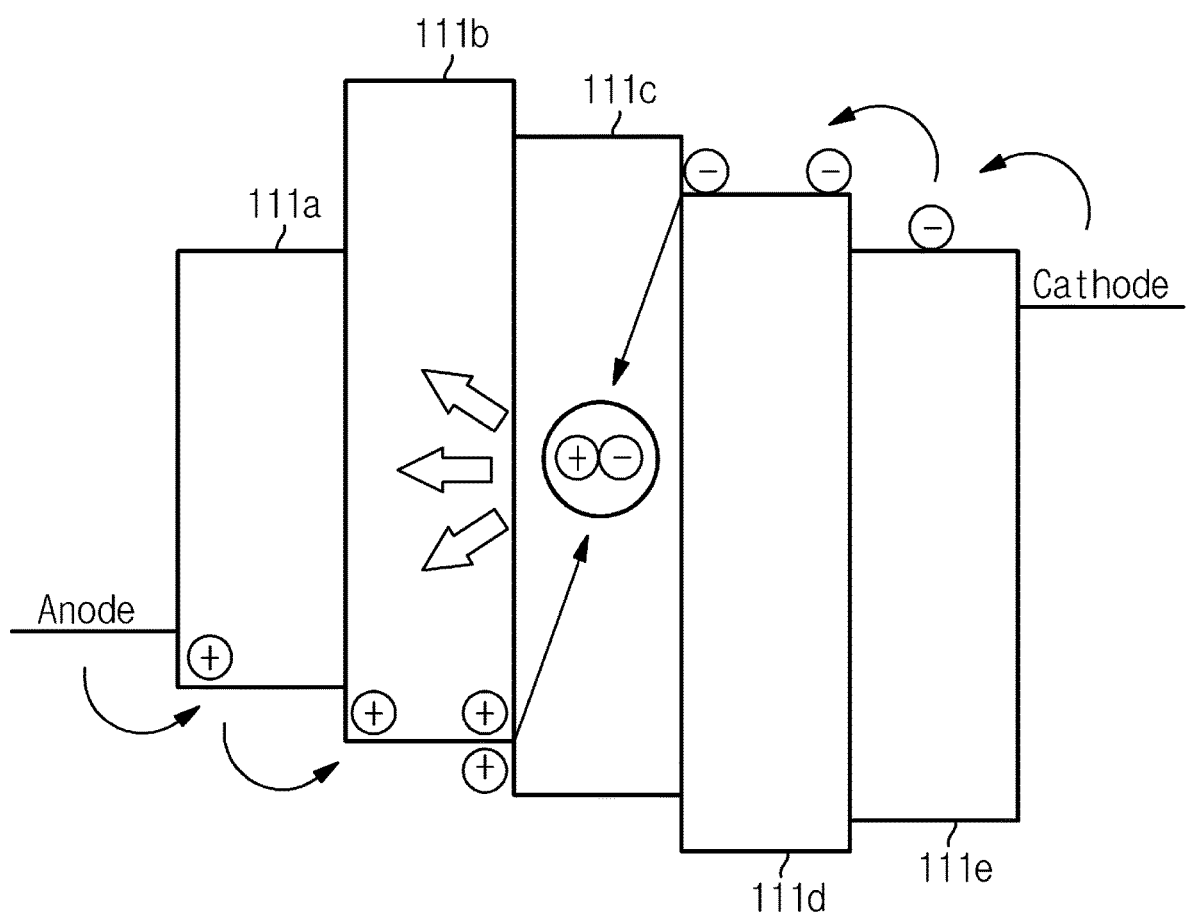
FIG. 5 is a view showing various state changes of a display panel according to an embodiment.

FIG. 3 is a block diagram illustrating some components of the display apparatus 100 according to an embodiment. FIG. 4 is an exploded perspective view of an exploded configuration of the display panel 110 according to an embodiment. FIG. 5 is a view showing various state changes of the display panel 110 according to an embodiment. FIGS. 6A, 6B, 7A, 7B, 8A and 8B are diagrams illustrating a range of vertical frequencies output according to types of reproduced images.

Referring to FIG. 3, the display apparatus 100 includes the display panel 110 for displaying an image received from an external device, a receiver 120 for receiving content including the image and sound from the external device, an image processor 130 for processing image data included in the content, a communicator 140 for transmitting and receiving various data such as the content through a communication network, a sound output 150 for outputting sound corresponding to sound data included in the content, an input 160 for receiving various control commands from a user, and a controller 170 to collectively control the operation of the display apparatus 100

At least one of the receiver 120, the image processor 130, the communicator 140, and the controller 170 may be integrated in a system on chip (SOC) embedded in the display apparatus 100. However, since there may be more than one system-on-chip embedded in the display apparatus 100, it is not limited to being integrated on one system-on-chip.

The display panel 110 may display an image received from an external device to the outside. Accordingly, the display panel 110 may be implemented as a liquid crystal display (LCD) panel, a light emitting diode (LED) panel, an organic light emitting diode (OLED) panel, or the like. However, the present invention is not limited thereto, and if the image is output and curvature deformation can be applied, the display panel 110 may be used.

For example, when the display panel 110 is implemented as a liquid crystal display (LED) panel, as shown in FIG. 4, it includes a display 111, a panel driver 112 and a backlight unit (BLU) 113.

The display 111 may display image information such as letters, numbers, figures, etc. by adjusting the transmittance of light passing through a liquid crystal layer, and the transmittance of light passing through the liquid crystal layer may be adjusted according to the intensity of an applied voltage.

The display 111 may include a color filter panel, a thin film transistor array (TFT) panel, a liquid crystal layer, and a sealant.

The color filter panel may include red, green, and blue color filters formed in regions corresponding to pixel electrodes of the TFT panel so that various colors can be displayed for each pixel. In addition, a common electrode made of a transparent conductive material such as ITO (Indium Tin Oxide) or IZO (Indium Zinc Oxide) may be formed on the color filter panel.

The TFT panel of the display unit 111 is spaced apart from the color filter panel and may include a plurality of gate lines, data lines, and pixel electrodes.

Here, the gate line is arranged in the row direction to transfer a gate signal, the data line is arranged in the column direction to transfer a data signal, and the pixel electrode is connected to the gate line and the data line, and may include a switching element and a capacitor.

Here, the switching element may be formed at the intersection of the gate line and the data line, and the capacitor may be connected to an output terminal of the switching element. Another terminal of the capacitor can be connected to a common voltage or the gate line.

The liquid crystal layer included in the display unit 111 is disposed between the color filter panel and the TFT panel, and includes a sealing material and liquid crystal accommodated in the sealing material. The alignment direction of the liquid crystal layer is changed by a voltage applied from the outside. At this time, the transmittance of light passing through the liquid crystal layer may be adjusted.

Meanwhile, the color filter panel, the TFT panel, and the liquid crystal layer of the display 111 constitute a liquid crystal capacitor. The liquid crystal capacitor configured as described above may be connected to the output terminal of the switching element of the pixel electrode and the common voltage or a reference voltage.

The panel driver 112 may include a gate driver 112a generating a gate pulse to supply the gate pulse to the gate line, and a data driver 112b generating a data voltage to supply the data voltage to the data line.

The data driver 112b may select a gradation voltage for each data line based on image data, and transmit the selected gradation voltage to the liquid crystal through the data line.

The gate driver 112a may turn on or off the thin film transistor by transmitting an ON or OFF signal based on the image data to the thin film transistor as a switching element through a scan line.

A source electrode of the TFT is connected to the data line, a gate electrode is connected to the gate line, and a drain electrode of the TFT can be connected to the pixel electrode of indium tin oxide (ITO). Such TFT can be turned on when a scan signal is supplied to the scan line to supply a data signal supplied from the data line to the pixel electrode.

The panel driver 112 provides gate driving signals and data driving signals based on gate control signals, data control signals, and related data signals to the gate lines and the data lines formed on the TFT panels, respectively, therefore a desired image can be implemented on the display 111.

The backlight unit 113 has a direct type method in which light is arranged on a lower surface of the display 111 to irradiate light, and an edge type method in which a light guide plate is installed under the display 111 and a light source installed at the edge of the light guide plate irradiates light.

As another example, when the display panel 110 is implemented as an OLED panel, since a self-light emitting device OLED is disposed in a pixel area formed by crossing the above-described gate line and data line, unlike other display panels, there is no need to provide a backlight unit.

As shown in FIG. 8, OLEDs disposed in each pixel constituting the display 111 of the display panel 110 are stacked with an organic compound layer such as a hole injection layer 111a between an anode and an cathode, a hole transport layer 111b, an emission layer 111c, an electron transport layer 111d, and an electron injection layer 111e.

An input image may be reproduced using a phenomenon in which electrons and holes in an organic light emitting diode disposed in each pixel are combined in an organic material layer by flowing a current through a thin film of a fluorescent or phosphorescent organic material.

When the display panel 110 is implemented as an OLED panel, it may be variously classified according to the type of light emitting material, light emitting method, light emitting structure, driving method, and the like.

It can be divided into fluorescence emission and phosphorescence emission according to the emission method, and can be divided into a top emission structure and a bottom emission structure according to the emission structure. In addition, it can be divided into a passive matrix OLED and an active matrix OLED according to the driving method.

The above-described structure of the display panel 110 is only an example that can be applied to the present disclosure, and other structures may be applied to the display panel 110 in addition to the above structure.

The receiver 120 can receive various contents from various external devices. For example, the receiver 120 may receive contents from an antenna that receives a broadcast signal wirelessly, a set-top box that receives a broadcast signal by wire or wirelessly and converts the new broadcast signal appropriately, and a multimedia playback device (e.g., DVD player, CD player, Blu-ray player, etc.) that plays content stored on a multimedia storage medium.

Specifically, the receiver 120 may include a plurality of connectors 121 connected to the external device, a reception path selector 123 for selecting a path to receive the content from among the plurality of connectors 121, a tuner 125 that selects a channel (or frequency) for receiving the broadcast signal, and the like.

The connector 121 may include a RF coaxial cable connector for receiving a broadcast signal containing the content from the antenna, a High Definition Multimedia Interface (HDMI) connector for receiving content from the set-top box or the multimedia playback device, a component video connector, a composite video connector, and a D-sub connector.

The reception path selector 123 selects a connector to receive content from among the plurality of connectors 121 described above. For example, the reception path selector 123 may automatically select the connector 121 for which the content has been received, or manually selects the connector 121 for receiving the content according to the user's control command.

When receiving a broadcast signal, the tuner 125 extracts a transmission signal of a specific frequency (channel) from various signals received through the antenna or the like. In other words, the tuner 125 may select a channel (or frequency) for receiving content according to the user's channel selection command.

When image data on a selected channel is received through the tuner 125, it may be transmitted to the image processor 130. Accordingly, the image processor 130 may acquire color data, an image control signal, and the like from the image data through an image processing process.

In addition, as shown in FIG. 3, the display apparatus 100 may include the image processor 130, and the image processor 130 may include a graphics processor 131 and a graphics memory 133.

The graphics memory 133 may store an image processing program for image processing and processed color data, or temporarily store image information output from the graphics processor 131 or image information received from the receiver 120.

The graphics processor 131 may process image data stored in the graphics memory 135 using an image processing program stored in the graphics memory 135 to obtain various data necessary for image restoration. For example, the graphics processor 131 may acquire an image control signal, color data, and the like by performing image processing on the image data among contents stored in the graphics memory 133.

In addition, data related to an application program, an algorithm, and the like for analyzing a color pattern of color data may be stored in the graphics memory 135. Alternatively, the graphics memory 133 stores data relating to a color pattern in which polarity is biased to one side, and the graphics processor 131 may use the data stored in the graphics memory 135 to determine whether polarity setting is required for each source drive or for each pixel connected to the source driver.

The communicator 140 may support various communication methods, including a wireless communication module 143 supporting a wireless communication method and a wired communication module 141 supporting a wired communication method.

The communication method includes a wireless communication method and a wired communication method. Here, the wireless communication method refers to a communication method capable of wirelessly transmitting and receiving a signal containing data. At this time, there are various communication methods such as 3G (3rd Generation), 4G (4th Generation), Wireless LAN, Wi-Fi, Bluetooth, Zigbee, WFD (Wi-Fi Direct), UWB (Ultra-wideband), Infrared Data Association (IrDA), Bluetooth Low Energy (BLE), Near Field Communication (NFC), and Z-Wave, but are not limited thereto.

In addition, the wired communication method refers to a communication method capable of transmitting and receiving a signal including data over a wire. For example, wired communication methods include, Peripheral Component Interconnect (PCI), PCI-express, and Universal Serial Bus (USB), but are not limited to. For example, the controller 170 may control the operation of the communicator 140 through a control signal, download various contents through a wired communication network or a wireless communication network, and provide the content to the user.

Meanwhile, the wired communication module 141 and the wireless communication module 143 may each be implemented as a single chip. However, the implementation form is not limited to the above, and there is no limitation such as that the wired communication module 141 and the wireless communication module 143 can be implemented by being integrated into a single chip.

Also, the sound output 150 may be provided in the display apparatus 100. The sound output 150 may receive sound data from the receiver 120 according to the control signal of the controller 170 and output sound. At this time, the sound output 150 may include one or two or more speakers 151 for converting electrical signals into acoustic signals.

The input 160 can receive various control commands from the user.

For example, as illustrated in FIG. 1, the input 160 may include a button group 161. In one embodiment, the button group 161 includes a volume button for adjusting the volume of sound output from the sound output 150, a channel button for changing a communication channel received by the receiver 120, and power buttons for turning on/off the power of the display apparatus 100, and the like.

In addition, the input 160 may receive various control commands related to the display apparatus 100 through the button group 161 described above from the user, and there is no limitation.

In addition, the input 160 may include a remote controller that receives a control command from the user remotely and transmits the received user control command to the display apparatus 100. In addition, the input 160 may include various well-known components that can receive a control command from the user, and is not limited thereof. In addition, when the display panel 110 is implemented as a touch screen type, the display panel 110 may perform the function of the input 160.

For example, the input 160 may receive a control command for the display apparatus 100 from the user through the button group 161 or the remote controller.

Accordingly, the input 160 may transmit an input control command to the controller 170, and the controller 170 may control at least one of the components of the display apparatus 100 through a control signal.

Meanwhile, the controller 170 may be provided in the display apparatus 100. The controller 170 may include a processor 171 and a memory 173 as shown in FIG. 2.

The memory 173 may store a control program and control data for controlling the operation of the display apparatus 100, and may temporarily store a control command received through the input 160 or a control signal output by the processor 171. Accordingly, the processor 171 may process various data stored in the memory 173 according to a control program stored in the memory 173.

The processor 171 may control the overall operation of the display apparatus 100. The processor 171 may generate a control signal for controlling the components of the display apparatus 100 to control the operation of each component.

In another embodiment, the processor 171 may transmit a control signal to the sound output 150 according to a sound adjustment command received through the input 160, so that the volume of the sound output through the speaker 151 can be adjusted.

As another example, the processor 171 may control the image processor 130 to perform image processing on the content received from the receiver 120, and may control the display panel 110 to display the image-processed image.

In the above, the processor 171 and the memory 173 are separately described. The processor 171 and the memory 173 are not limited to being provided as separate chips, and the processor 171 and the memory 173 may be provided as a single chip.

Also, the controller 170 may change an image processing mode of an image displayed on the display panel 110. That is, the controller 170 may analyze the characteristics of the image received from the external devices 200 and 300 and change the image processing mode of the output image when it is determined that a change in the image processing mode of the currently displayed image is necessary.

Specifically, when a change per hour of a vertical frequency of a video signal of the currently reproduced video exceeds a preset range, the controller 170 may change the image processing mode of the image displayed on the display panel 110 to a mode corresponding to the vertical frequency change.

Specifically, in order to reproduce the image received from the external devices 200 and 300 in the display apparatus 100, an image processing process is required. The vertical frequency of the output image signal changes in real time due to the characteristics of the image. That is, the frames per second (Fps) rate of the vertical frequency output from the reproduced image has a different range according to the characteristics of the reproduced image.

Figure 6A:
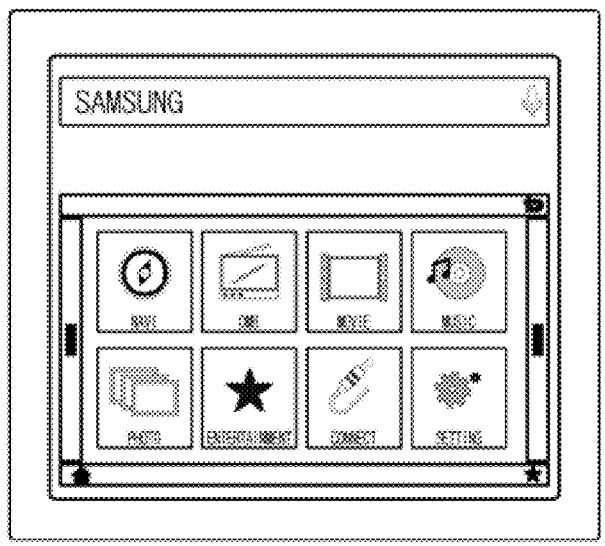
FIGS. 6A, 6B, 7A, 7B, 8A and 8B are diagrams illustrating a range of vertical frequencies output according to types of reproduced images.
Figure 6B:
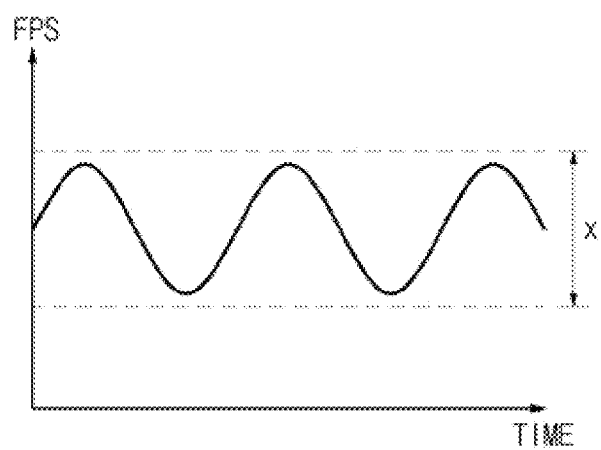

For example, in the case of a document or a web page in which an image played on the display apparatus 100 is mainly composed of text as shown in FIG. 6A since the variability of the image is small, the range of change of the vertical frequency of the image signal moves within a certain range as shown in FIG. 6B.

Figure 7A:
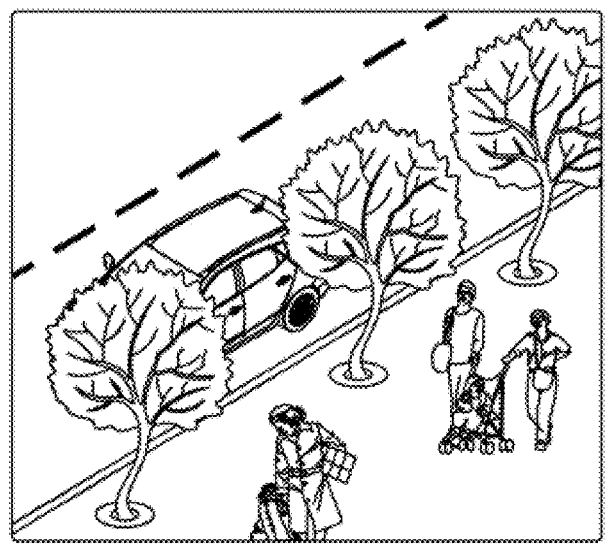
Figure 7B:
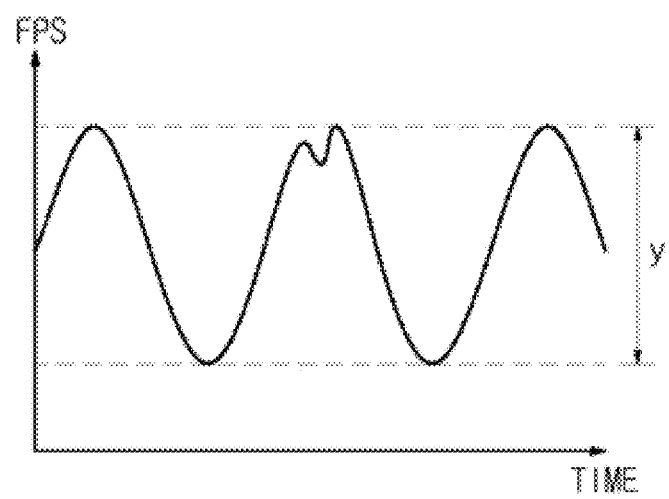

However, in the case of a genre such as a drama or a movie in which the image reproduced on the display apparatus 100 has a variable image as shown in FIG. 7A, the range of change in the vertical frequency of the video signal moves in a range (y) that is wider than a range of change (x) in the vertical frequency output from a document or web page, as shown in FIG. 7B.

In other words, in the case of a genre such as a drama or a movie, the variability of a video is relatively larger than a document or a web page. Therefore, the range (y) of the vertical frequency of the video signal output from the image of a genre such as a drama or a movie is wider than the range (x) of the vertical frequency fluctuating in a document or web page.

Figure 8A:
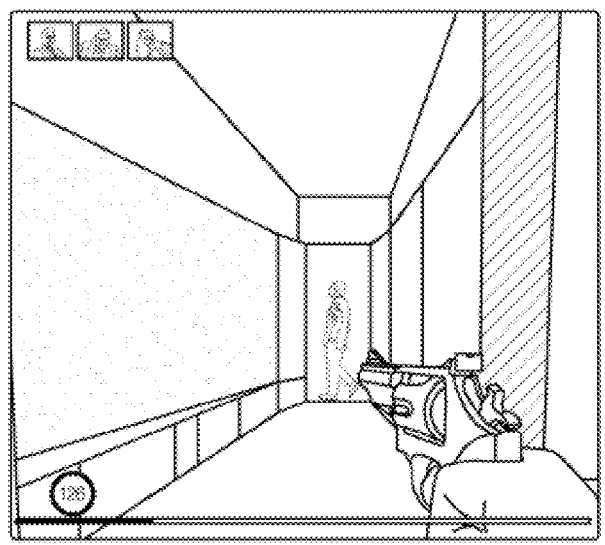
Figure 8B:
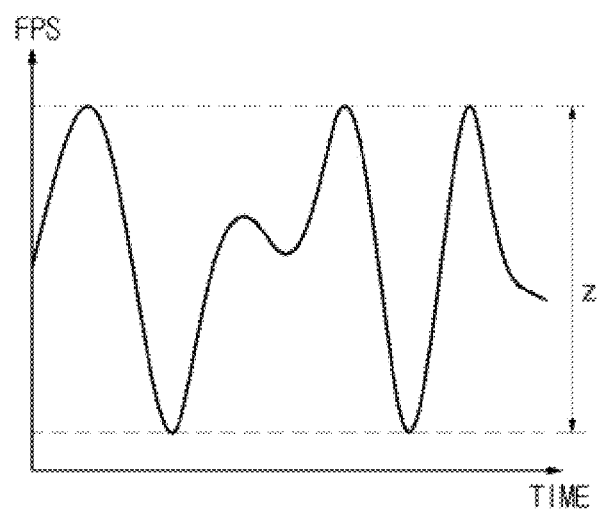

In addition, when the genre of the image played on the display apparatus 100 is a genre, such as a game with large variability, as shown in FIG. 8A, or the case of a high-definition image, a range (z) of the vertical frequency change of the video signal is wider than the range (y) of the vertical frequency output from a genre such as a drama or a movie, as shown in FIG. 8B.

Therefore, when the image reproduced on the display apparatus 100 is a high quality image or an image having a large vertical frequency change of the image signal, unlike a case in which an image such as a document is reproduced, the image may be processed as an enhanced image to provide a more vivid image to the user.

However, in the case of the prior art, there is no efficient criterion for distinguishing between an image that needs to be improved and an image that is not, and thus there is a disadvantage in that a more vivid image quality should be provided.

Therefore, the display apparatus 100 according to an embodiment analyzes a change in a vertical frequency of a video signal output from a reproduced image, color information, and image information, and changes the image processing mode of the reproduced image based on the analyzed change in the vertical frequency of the image signal output from a reproduced image so that the display apparatus 100 is able to provide a more dynamic image to the user.

In addition, when the image processing mode of the reproduced image is changed, the user can more easily change the image processing mode according to the user's preference by providing the user with a guide screen for changing the image processing mode.

Hereinafter, an operation sequence of the display apparatus 100 according to an embodiment will be described.

Figure 9:
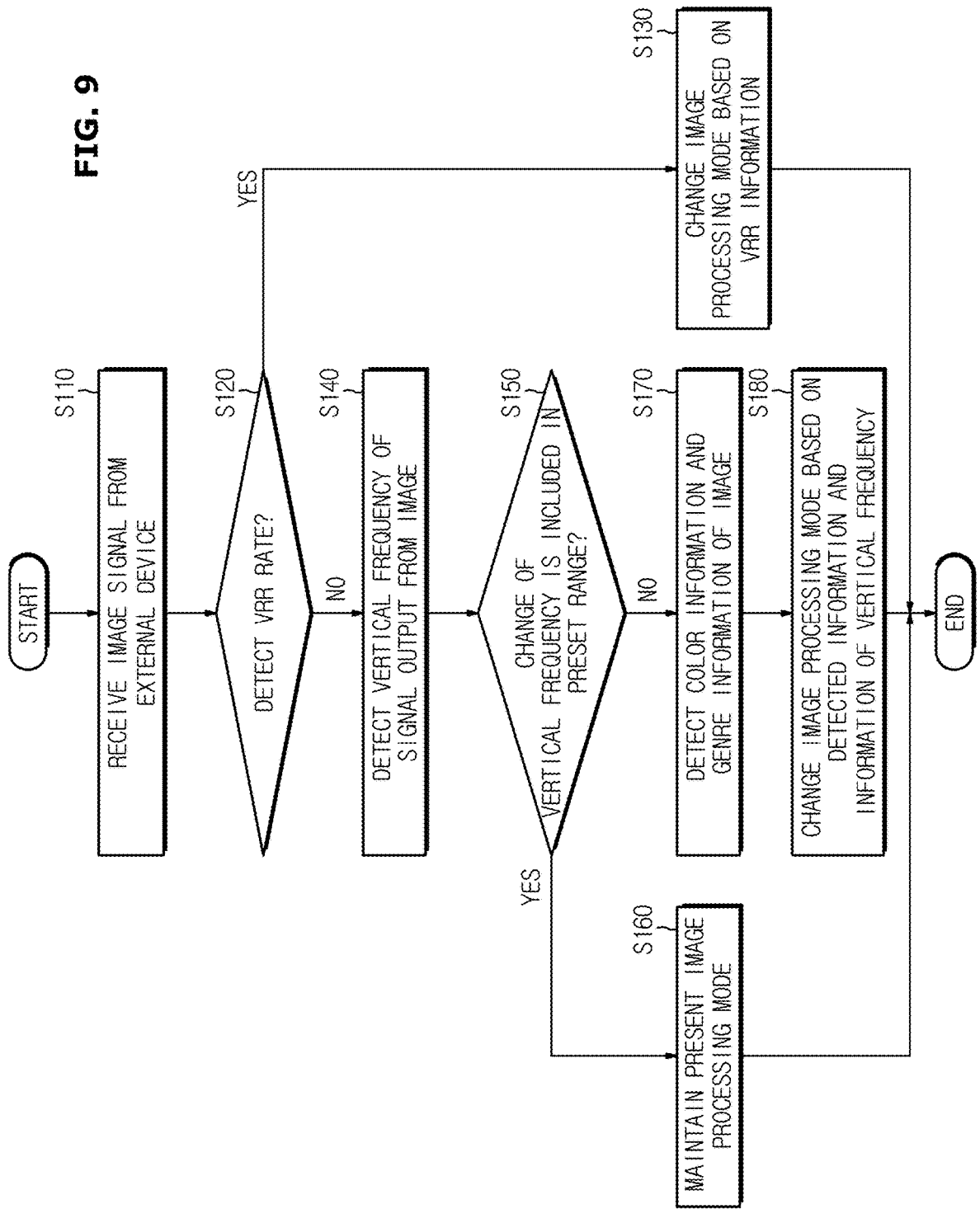
FIG. 9 is a flowchart illustrating a method of controlling a display device according to an embodiment.

FIG. 9 is a flowchart illustrating a method of controlling a display device according to an embodiment. FIG. 10 is a diagram illustrating a case in which a range of vertical frequencies output from an image is included in a preset range and a case in which the range is not included.

Referring to FIG. 9, the display apparatus 100 may receive an image to be played on the display panel 110 from the external devices 200 and 300 (S110).

Specifically, the display apparatus 100 uses an HDMI (High-Definition Multimedia Interface) connector or a DP connector provided on one side of the display apparatus 100, and an image signal of an image to be played back may be received from the external devices 200 and 300 on the display panel 100.

The external devices 200 and 300 are devices that can provide video such as optical media playback devices such as DVD or Blu-ray players, UHD players, set-top boxes, TVs, computer bodies, mobile devices, game consoles, home theaters, etc., and a reception method may be various by using a wired cable or wireless communication.

When an image signal is received from the external devices 200 and 300, the display apparatus 100 may detect whether variable refresh rate (VRR) information can be received from the received image (S120).

The VRR information is information including information on a real-time frame change of a reproduced image. When the display apparatus 100 is equipped with an HDMI 2.1 function, the VRR information of the received image may be received.

If the VRR information is detected, since the VRR information includes information on the frame change of the reproduced image, the display apparatus 100 may change the image processing mode of the reproduced image based on the frame change of the reproduced image (S130).

In addition, in the process of S120 of FIG. 9, it has been described that the display apparatus 100 receives information on a vertical frequency change of an image signal through the VRR information, but the present invention is not limited thereto. It is also possible to receive information about the vertical frequency change.

However, when the display apparatus 100 is not equipped with the HDMI 2.1 function or when receiving video signals from the external devices 200 and 300 through a DP cable, the frame information of the played video is not known, so the display apparatus 100 detects changes in the vertical frequency (S140).

Specifically, the display apparatus 100 may determine whether a vertical frequency change of the image signal output from a reproduced image is included in a preset range. (S150)

Figure 10A:
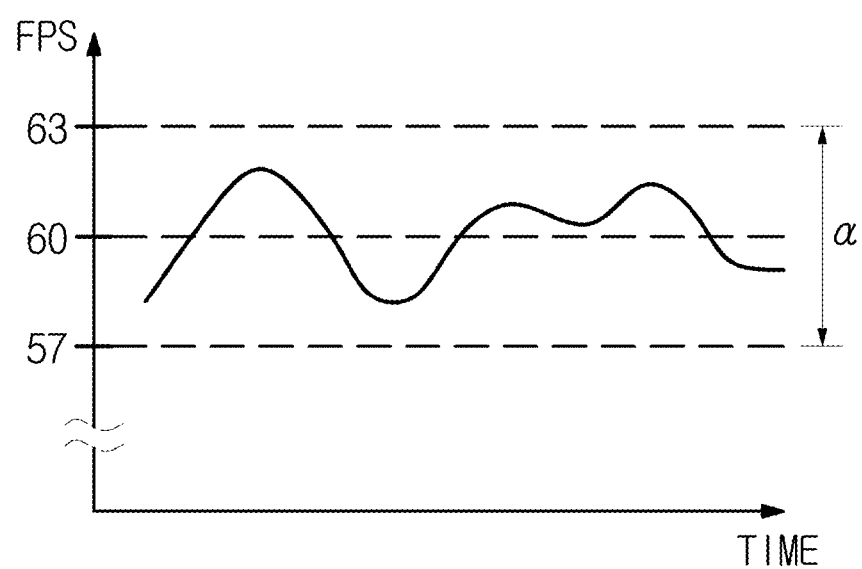
FIGS. 10A and 10B is a diagram illustrating a case in which a range of vertical frequencies output from an image is included in a preset range and a case in which the range is not included.
Figure 10B:
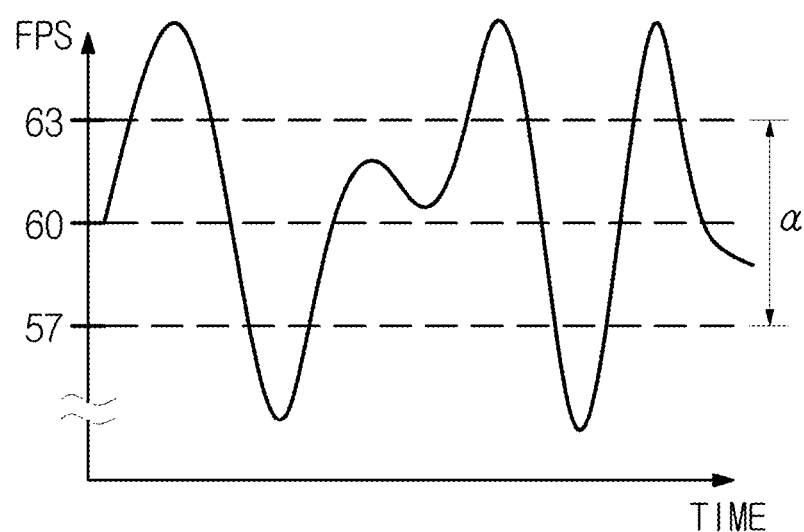

FIG. 10A is a diagram illustrating a case in which a vertical frequency of an output signal satisfies a preset range, and FIG. 10B is a diagram illustrating a case in which a vertical frequency of an output signal exceeds a preset range.

Referring to FIG. 10A, the vertical frequency range of the output signal is moving within a range a of 57 fps (Frames Per Second) to 63 fps. Therefore, in this case, since the vertical frequency moves within the preset range a, the current image processing mode can be maintained without changing the image processing mode of the reproduced image.

However, as illustrated in FIG. 10B, when the vertical frequency range of the output signal is moving beyond the range a, it is necessary to improve the image quality, thus it is necessary to change the image processing mode of the output image.

Therefore, the preset range refers to a case where the variable range of the vertical frequency is wide enough to improve the image quality, as shown in FIGS. 10A and 10B, although it is illustrated in a range of +3 and −3 based on 60 fps, the present invention is not limited thereto, and may be set in various ranges according to the characteristics of the reproduced image or the user's preference.

In addition, in FIG. 10, a preset range is described based on a range of the vertical frequency, but the present invention is not limited thereto, and it may be determined whether the preset range is satisfied by whether the vertical frequency exceeds the preset value. For example, when the vertical frequency exceeds 63 fps, it may be determined that the preset range is exceeded.

When the change in the vertical frequency included in a preset range is detected, it is not necessary to change the image processing mode of the reproduced image, so the current image processing mode can be maintained. When the preset range is exceeded, it is necessary to change the image processing mode, so the display apparatus 100 can detect the color information and the genre information of the reproduced image in order to change the image processing mode of the reproduced image. (S160, S170)

The color information may include at least one of RGB (Red, Green, Blue) information and YcbCr information, and the genre information may include at least one of a drama genre, a movie genre, a game genre, news genre, and a sports genre.

The YcbCr information is a kind of color space used in an imaging system, where Y is a luminance component and cb and Cr are color difference components.

The display apparatus 100 may change the image processing mode of the currently played image to the most optimized image processing mode based on the detected information and the vertical frequency change information. (S180)

That is, the display apparatus 100 may perform image processing in a manner in which a set value is variously changed according to a detected genre.

For example, in the case of a game genre, it is most important to minimize the delay of the reproduced image, so release the memory buffer functions to minimize the delay of the image including lip-sync processing (By-pass).

Also, to remove motion blur, an impulse or backlight scanning function may be activated.

In addition, when high dynamic range (HDR) information can be detected from the received video signal, an image with improved image quality may be provided by applying a tone-mapping function related to HDR.

In addition, when the reproduced image is a movie genre, the image processing mode may be changed to reproduce the image with improved contrast of color or sharpness of color. In addition, it is possible to change the image processing mode to an image processing mode to which HDR and De-Judder functions are applied.

In addition, as will be described later in detail in FIG. 11, when the image processing mode needs to be changed, information on various setting values described above is displayed on the display panel 110 in performing image processing, thereby helping the user to select details.

In addition, the display apparatus 100 may change the image processing mode of the reproduced image by reflecting the characteristics of the genre when the reproduced image is a news genre, a drama genre, or a sports genre.

In addition, in FIG. 9, the color information and the genre information of an image are detected when a change in the vertical frequency is not included in a preset range. Although it is illustrated that the image processing mode of the reproduced image is changed based on the detected color information and the genre information of the image, the process of S180 may be omitted and the image processing mode may be changed based only on a range of change of the vertical frequency.

For example, if the range of change of the vertical frequency is wide as in FIG. 8B, it is determined that the currently reproduced image needs to improve the game genre or image quality, and the image processing mode can be changed accordingly.

Conversely, if the range of change of the vertical frequency exceeds a preset range as shown in FIG. 7B, but if the extent of the excess is not wide as shown in FIG. 8B, the currently played image is judged as a movie or drama genre mode, and can change the image processing mode to a mode suitable for the judged genre.

In addition, although not shown in FIG. 9, after changing the image processing mode, if an hourly change of the vertical frequency is included in a preset range, the image processing mode may be changed before changing the image processing mode.

Figure 11:
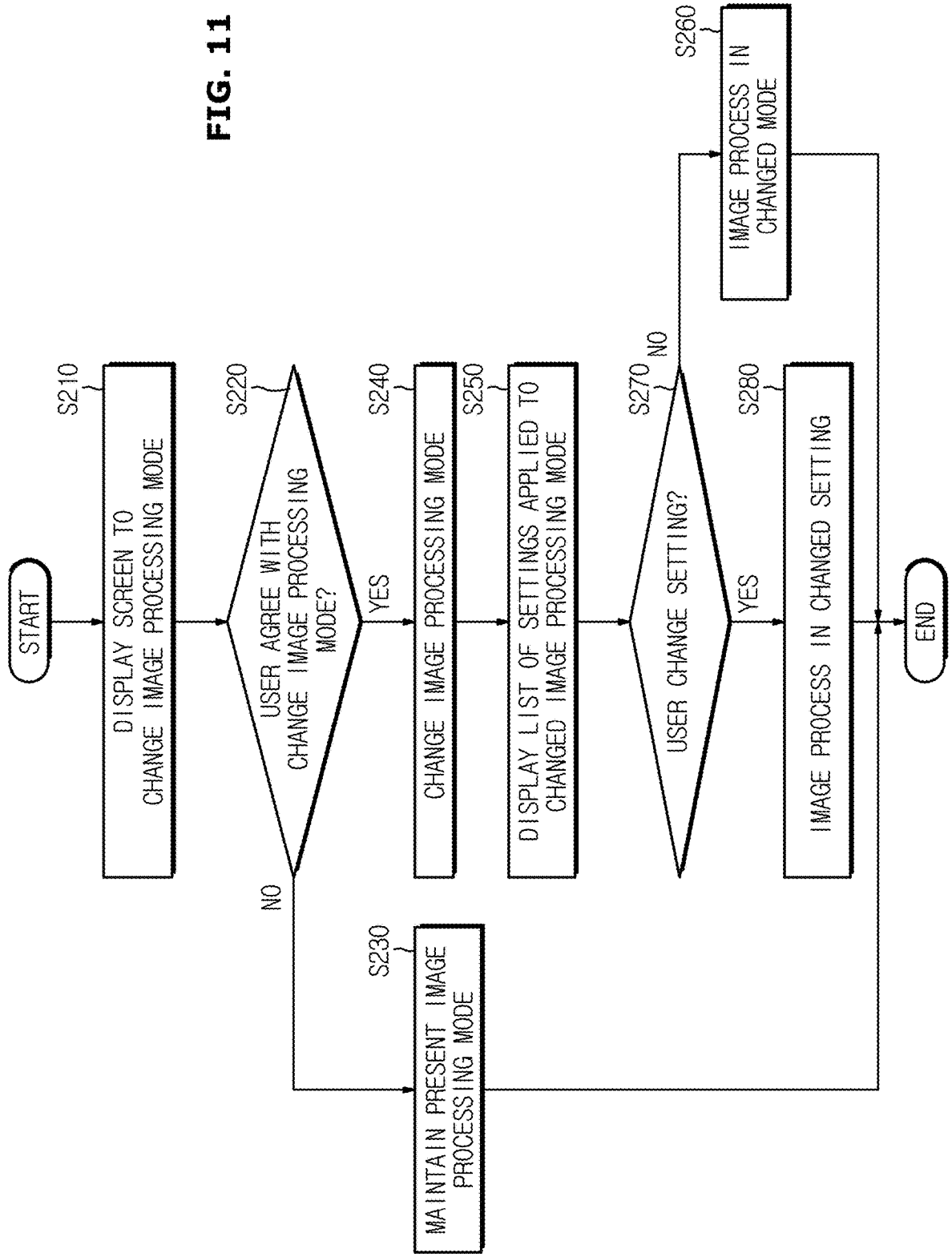
FIG. 11 is a flowchart illustrating a method of controlling a display apparatus according to another embodiment.
Figure 12:
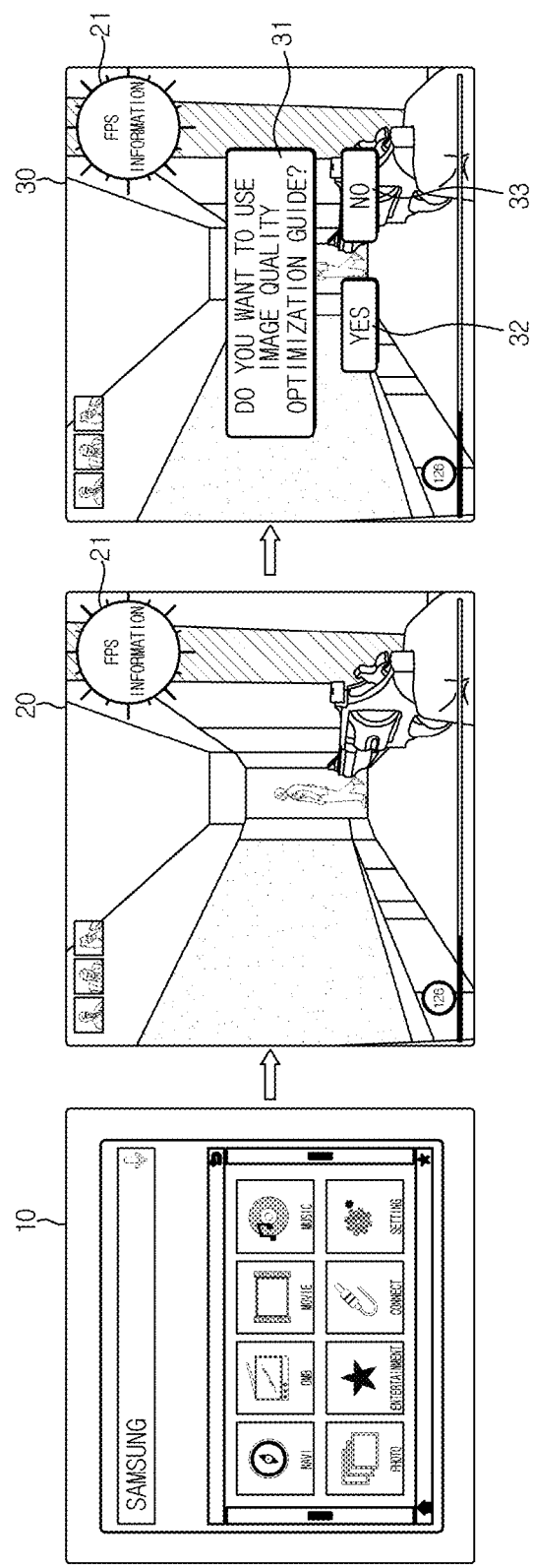
FIG. 12 is a view showing a screen asking whether to change a playback mode displayed on a display panel according to another embodiment.
Figure 13A:
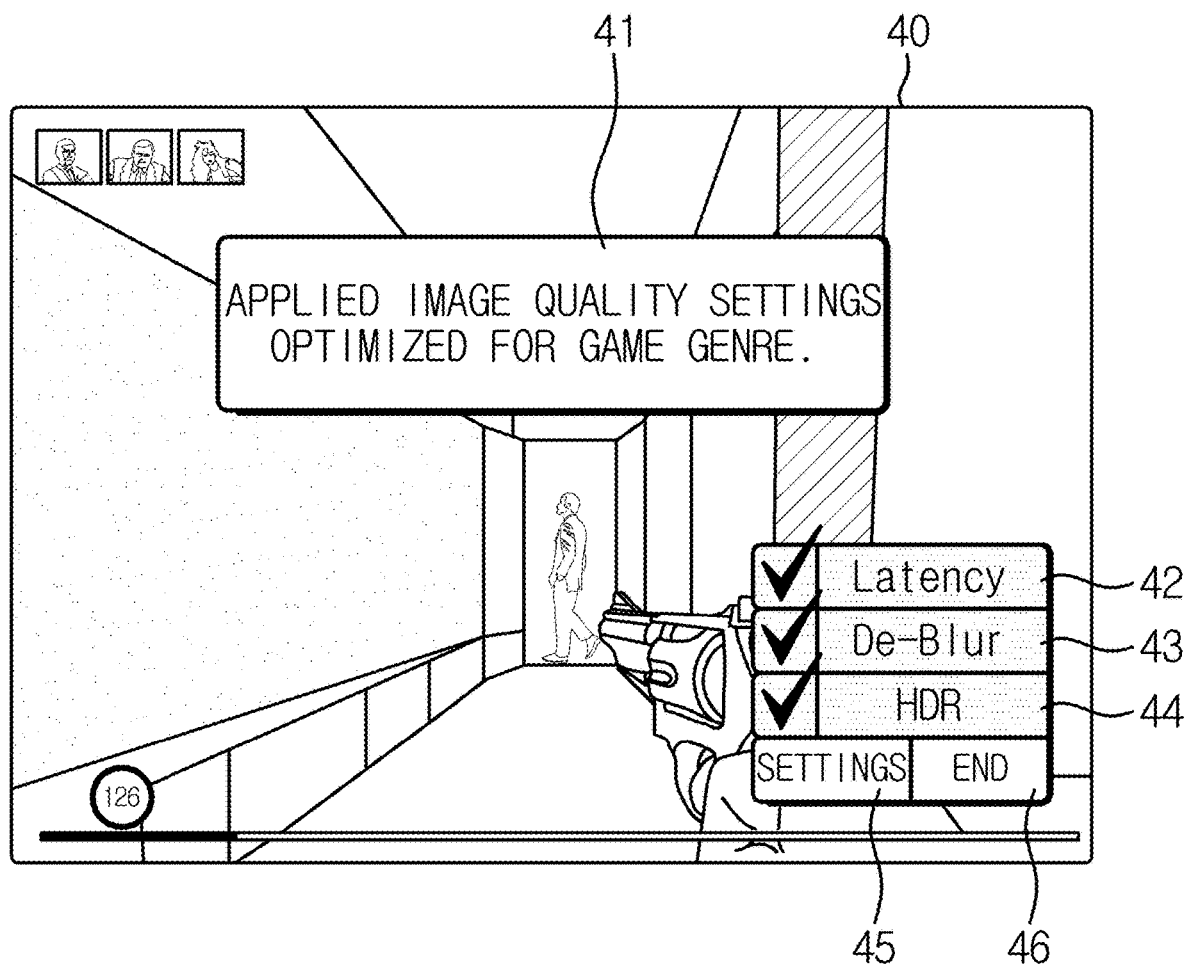
FIGS. 13A and 13B are a diagram illustrating a screen displayed on a display panel when a playback mode is changed according to another embodiment.
Figure 13B:
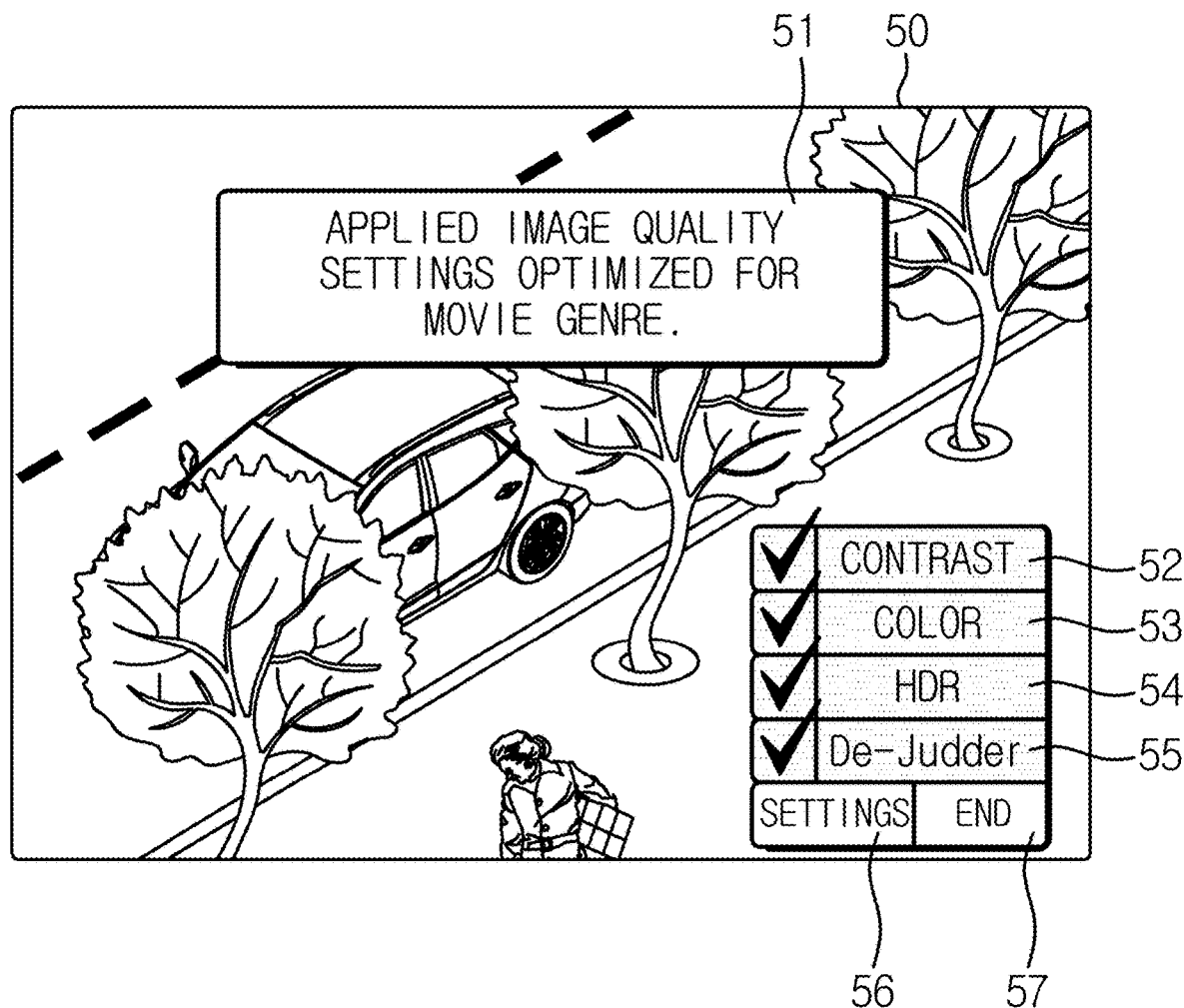
Figure 14A:
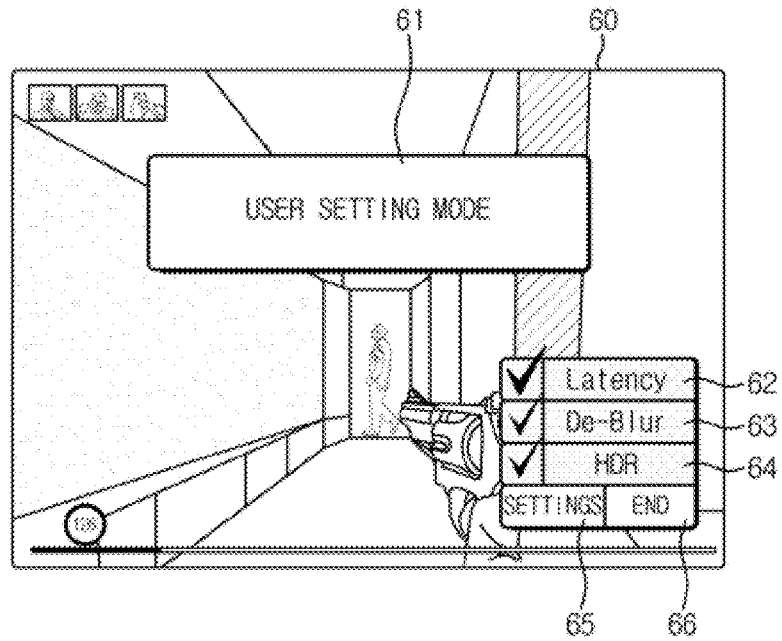
FIGS. 14A and 14B are a diagram illustrating a process in which a user cancels some settings in a changed play mode according to another embodiment.
Figure 14B:
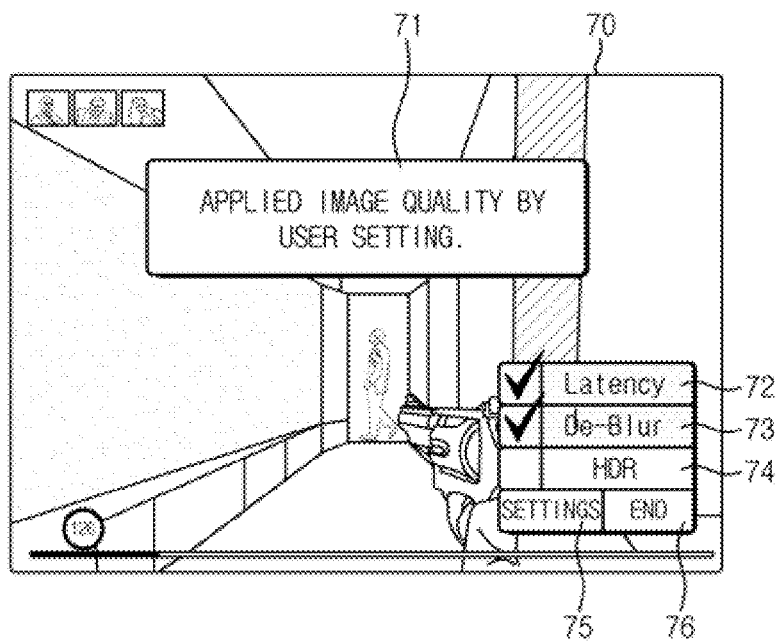

FIG. 11 is a flowchart illustrating a method of controlling a display apparatus according to another embodiment. FIG. 12 is a view showing a screen asking whether to change a playback mode displayed on a display panel according to another embodiment. FIGS. 13A and 13B are a diagram illustrating a screen displayed on a display panel when a playback mode is changed according to another embodiment. FIGS. 14A and 14B is a diagram illustrating a process in which a user cancels some settings in a changed play mode according to another embodiment.

Specifically, the flowchart of FIG. 11 illustrates, a procedure of asking the user for a change or not and changing the image processing mode according to the user's instructions, when it is determined that the display apparatus 100 needs to change the image processing mode of the currently played image.

Referring to FIG. 11, when the change in the vertical frequency output from the currently played image according to FIG. 10 is outside a preset range, the display apparatus 100 displays a screen asking whether to change the image processing mode on the display panel 110. (S210)

Referring to FIG. 12, when a screen 10 such as a web document is displayed on the display panel 110 and then a game genre screen 20 is displayed on the display panel 110, the display apparatus 100 detects a change amount per unit time of a vertical frequency. When it is out of a preset range, a screen 30 asking whether or not to change the image processing mode may be displayed on the display panel 110.

Specifically, the display panel 110 may display the screen 30 asking whether to change to the image processing mode generated based on the hourly change of the vertical frequency and the color information and the genre information of the reproduced image.

If the screen asking the user whether to change the image processing mode is displayed on the display panel 110, it may be determined whether the user has agreed to change the image processing mode. (S220)

If the user does not agree to change the image processing mode, the image processing mode is maintained as the current image processing mode. If the user agrees to change the image processing mode, the image processing mode may be changed to a mode corresponding to the currently played image and a list of settings applied to the changed image processing mode may be displayed on the display panel 110. (S230, S240, S250)

FIGS. 13A, 13B and 13C are a view showing a screen displayed on the display panel 110 after the image processing mode is changed according to the process of S240.

Specifically, FIG. 13A shows a screen displayed when an image processing mode is changed from the currently played image to an image processing mode optimized for a game genre. FIG. 13B illustrates a screen displayed when an image processing mode is changed to an image processing mode optimized for a movie genre.

Referring to FIG. 13A, when the image processing mode of the currently played image is changed, a screen 41 indicating that the optimized image quality setting has been applied to the game genre can be displayed on the display panel 110, and at the same time, a list of settings 42, 43 and 44 applied to the changed image processing mode.

For example, as illustrated in FIG. 13A, it may be indicated that the setting 42 for reducing the image playback waiting time, the de-saturation setting 43 (De-Blur), and the HDR setting 44 are applied.

When the changed image processing mode is changed to an image processing mode optimized for the movie genre, the display panel 110 may display a screen 51 indicating that the image processing mode optimized for the movie genre is applied to the currently played image. At the same time, it is possible to display a list of settings 52, 53, 54, and 55 applied to the changed image processing mode.

For example, as illustrated in FIG. 13A, the image displays the settings with improved contrast and color of the image 52, 53, HDR setting 44, and anti-shake setting 45, De-Judder.

The list of settings shown in FIGS. 13A and 13B is only an example, and other settings that may affect image quality of a reproduced image may also be included. In addition, although not shown in the drawings, a screen displaying a description of the list of settings to the user may be displayed separately or simultaneously.

Returning to FIG. 11, if a list of settings applied to the changed play mode is displayed, it may be determined whether the user has changed the settings thereafter. (S270)

If the user has not changed the detailed settings in the changed play mode, the image may be played in the changed mode, but otherwise, if the user has changed the detailed settings, the image may be played based on the changed settings. (S280)

The screen of FIG. 14A is a screen displayed on the display panel 110 when the user clicks or touches setting icons 45 and 56 in FIGS. 13A and 13B.

Referring to FIG. 14A, a user setting mode screen 60 may display a screen 61 indicating that the current screen is a user setting mode, and a detailed list of settings 62, 63, and 64 applied to the currently played image.

Since the user setting mode is to change the detailed settings based on the changed play mode, as shown in FIG. 14A, the detailed settings can be basically displayed as being applied.

Therefore, the user can change the detailed settings based on the screen 60 of FIG. 14A. For example, when the user releases the HDR setting as shown in FIG. 14B, an HDR setting released screen 70 may be displayed on the display panel 110.

FIGS. 14A and 14B illustrate a sequence in which the user controls detailed settings after the changed play mode is changed to a play mode suitable for the game genre, but is not limited thereto. Users can control detailed settings even after the playback mode is changed to a mode suitable for other genres such as a movie genre or a news genre.

Figure 15A:
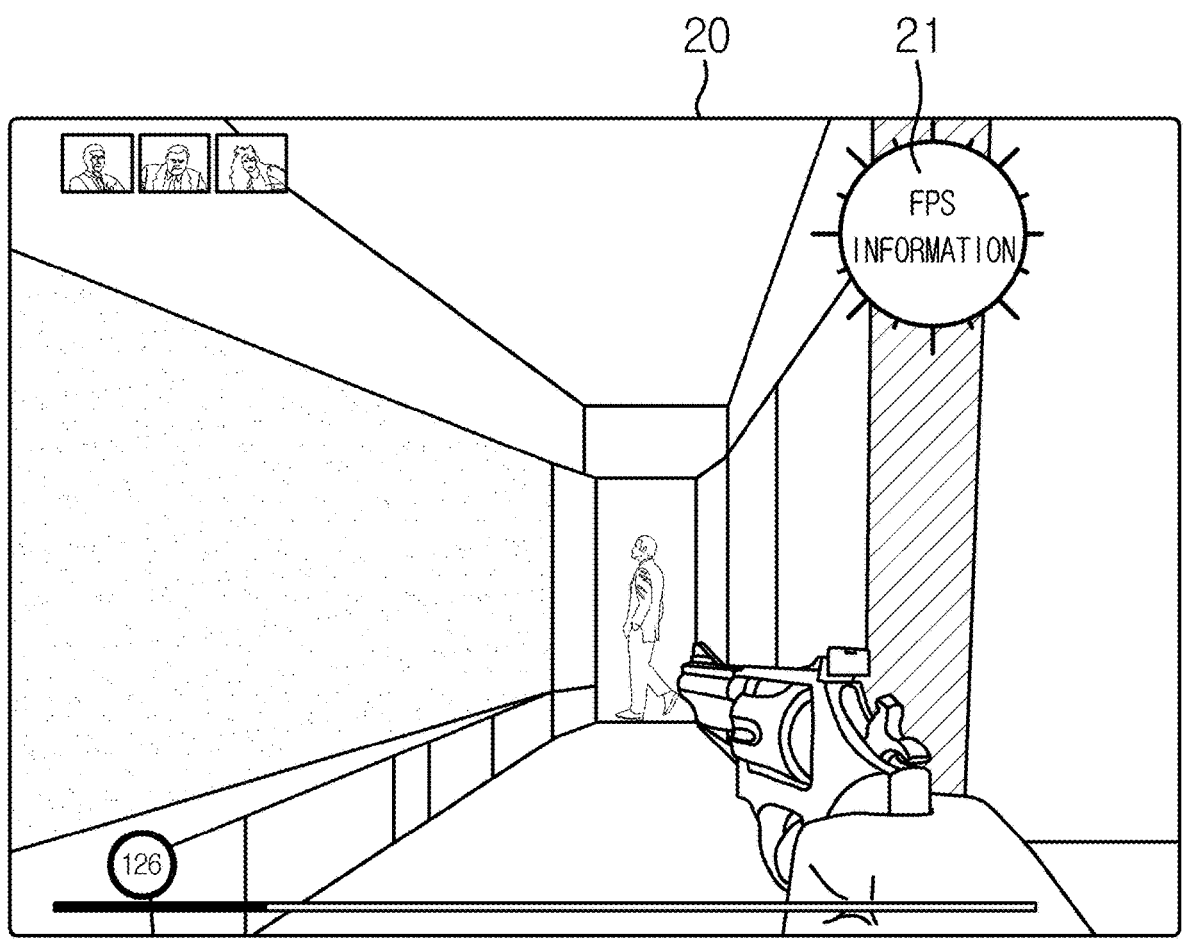
FIGS. 15A, 15B and 15C are a view showing a change in vertical frequency detected in real time according to another embodiment.
Figure 15B:
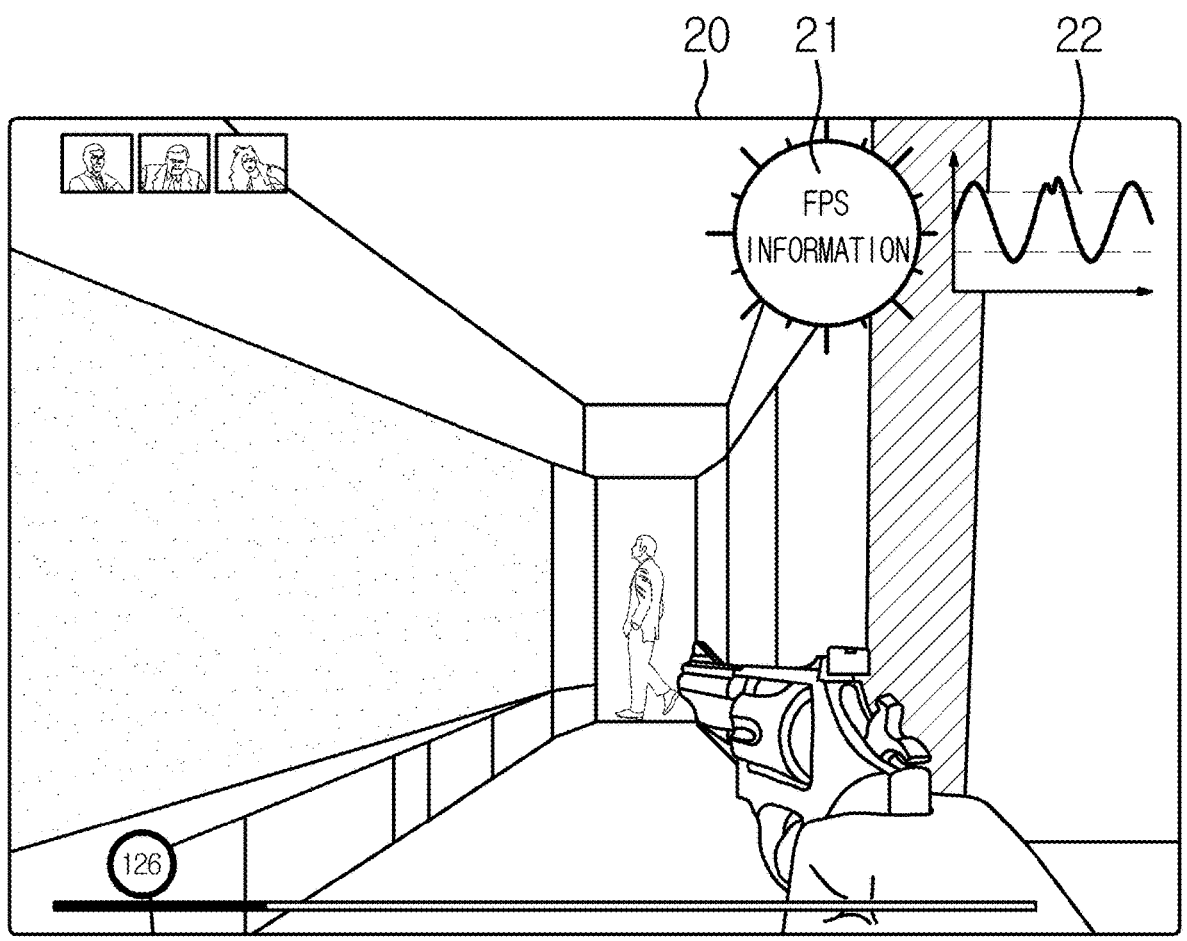
Figure 15C:
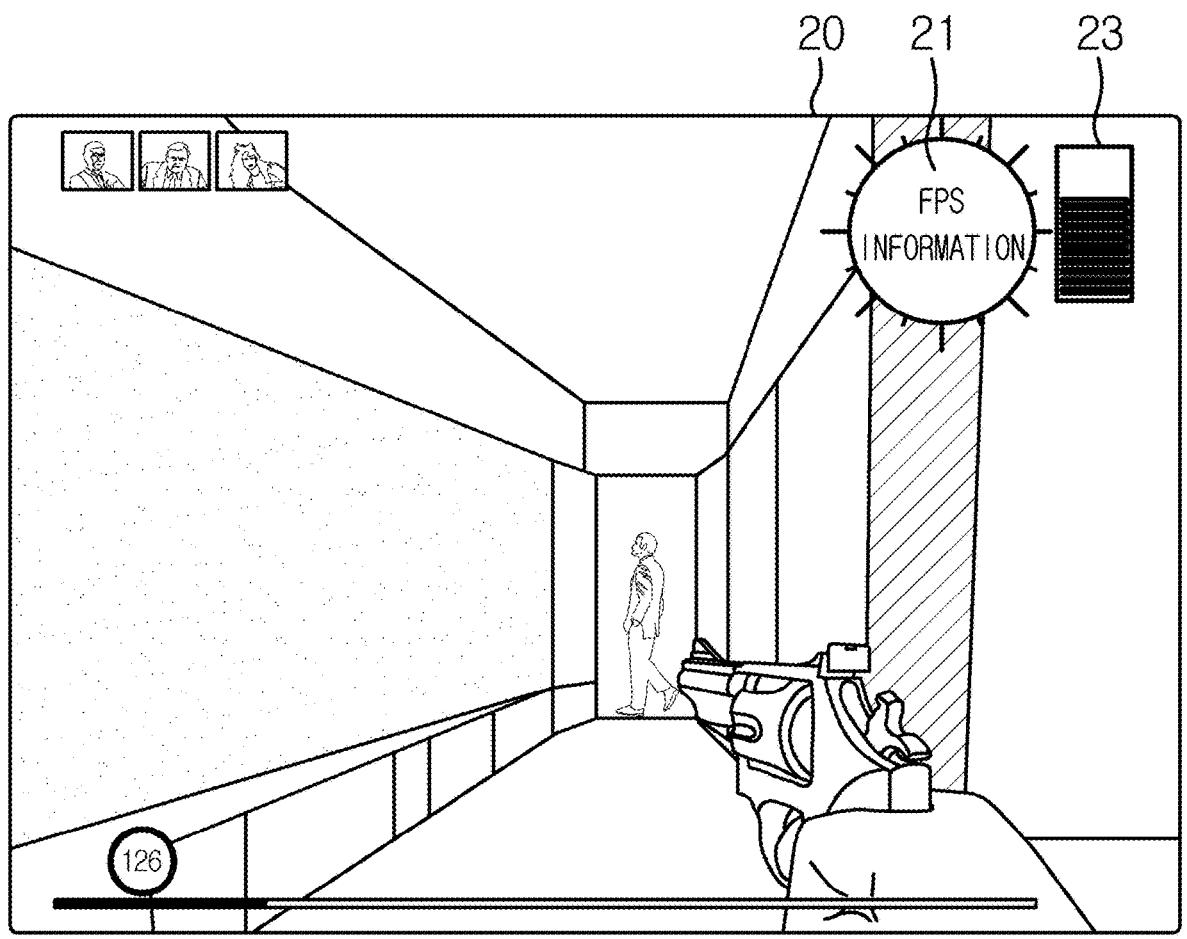

FIGS. 15A, 15B and 15C are a diagram illustrating a state in which a change in vertical frequency sensed in real time is displayed on the display panel 110 according to another embodiment.

Referring to FIG. 15A, when a change in vertical frequency is detected, an icon 21 indicating that change information of the vertical frequency (FPS) is being received may be displayed on the screen 20 on the display panel 110.

In addition, as shown in FIG. 15B, a graph 22 can be used to display a change in vertical frequency sensed in real time, and as shown in FIG. 15C, a gauge increases in the vertical frequency in a manner 23. Therefore, since the display apparatus 100 according to an embodiment provides the user with information about the vertical frequency change sensed in real time, it is possible to more easily determine the change of the playback mode of the image.

The display apparatus 100 and a control method thereof according to an embodiment have been described through the drawings.

In general, when a display device plays an image received through an external device, since the format, playback method, etc. of the provided image vary, in order to reproduce the image with optimized image quality, it must be set according to the characteristics of the image and the function of the display device being reproduced.

However, in the case of the prior art, in order to play an the optimized image, there was an inconvenience in that the user had to directly change the setting of the image quality or sound quality, and even if the user directly changes the setting of the image quality or sound quality, the method is complicated and difficult, and the user often gives up halfway.

However, the display apparatus 100 according to an embodiment analyzes the characteristics and types of images received from an external device, and on the basis of this, by automatically changing the image processing mode of the played image or by providing the user with a guide for changing the image processing mode, there is an effect that can more easily provide an optimized image to the user.

Although embodiments have been described thus far with limited embodiments and drawings, those skilled in the art can make various modifications and variations from the above description. For example, the described techniques are performed in an order different than the described method, and/or components of the described systems, structures, devices, circuits, etc. are combined or combined in a form different from the described method, or appropriate results can be achieved even if replaced by other components or equivalents.

Therefore, other implementations, other embodiments, and equivalents to the claims are also within the scope of the following claims.

The invention claimed is:

1. A display apparatus, comprising:
a display panel on which an image is displayed;
a receiver configured to receive an image signal related to the image from an external device; and
a controller configured to change an image processing mode of the image based on a change in a vertical frequency of the image signal by changing a display setting applied to the image,
wherein the controller is configured to change the image processing mode into a first mode by applying a first display setting corresponding to a first genre to the image when the vertical frequency of the image signal changes within a first preset range for a preset time, and change the image processing mode to a second mode by applying a second display setting corresponding to a second genre to the image when the vertical frequency of the image signal changes within a second preset range for the preset time.

2. The display apparatus of claim 1, wherein the controller is configured to change the image processing mode into a third mode by applying a third display setting corresponding to a third genre to the image when the vertical frequency of the image signal changes within a third preset range for the preset time.

3. The display apparatus of claim 1, wherein the first preset range is included in the second preset range.

4. The display apparatus of claim 1, wherein the controller is configured to change the image processing mode of the image based on variable refresh rate (VRR) information when the image includes the VRR information.

5. The display apparatus of claim 1, wherein the controller is configured to change the image processing mode of the image based on at least one of color information of the image or genre information of the image.

6. The display apparatus of claim 1, wherein the first genre and the second genre are different from each other, and each of the first genre and the second genre is a game genre, a movie genre, a drama genre, or a news genre.

7. The display apparatus of claim 1, wherein the display setting includes at least one of information regarding brightness, color, sharpness, contrast, blurring, or mura of the image.

8. The display apparatus of claim 6, wherein the controller is configured to perform an image process by applying at least one of a delay prevention function, a motion blur removal function, or a high dynamic range (HDR) function when the image processing mode is changed into the first mode corresponding to the game genre.

9. The display apparatus of claim 6, wherein the controller is configured to perform an image process by applying at least one of a contrast function, a sharpness function, an HDR function, or a De-Judder function of the image when the image processing mode is changed into the first mode corresponding to the movie genre.

10. The display apparatus of claim 1, wherein the controller is configured to display the display setting applied to the changed image processing mode on the display panel after the image processing mode of the image is changed.

11. The display apparatus of claim 10, wherein the controller is configured to display a screen on which a user is able to cancel part of the display setting on the display panel.

12. The display apparatus of claim 1, wherein the controller is configured to, after changing the image processing mode of the image into the second mode, change the image processing mode into the first mode if the vertical frequency of the image signal changes within the first preset range for the preset time.

13. The display apparatus of claim 10, wherein the controller is configured to display information related to the change of the vertical frequency on the display panel.

14. A method of controlling a display apparatus, the method comprising:
receiving an image signal related to an image from an external device; and
changing an image processing mode of the image displayed on a display panel based on a change of a vertical frequency of the image signal by changing a display setting applied to the image,
wherein the changing of the image processing mode comprises:
changing the image processing mode into a first mode by applying a first display setting corresponding to a first genre to the image when the vertical frequency of the image signal changes within a first preset range for a preset time; and
changing the image processing mode to a second mode by applying a second display setting corresponding to a second genre to the image when the vertical frequency of the image signal changes within a second preset range for the preset time.

15. The method of claim 14, wherein the changing of the image processing mode further comprises: changing the image processing mode into a third mode by applying a third display setting corresponding to a third genre to the image when the vertical frequency of the image signal changes within a third preset range for the preset time.

16. The display apparatus of claim 1, wherein the controller is configured to change the image processing mode of the image based on a range of change of the vertical frequency of the image signal, and wherein the controller is configured to change the image processing mode into the first mode when the range of change of the vertical frequency for a preset time is as wide as the first preset range, and change the image processing mode to the second mode when the range of change of the vertical frequency for the preset time is as wide as the second preset range, the second preset range being wider than the first preset range.

17. The display apparatus of claim 16, wherein the controller is configured to change the image processing mode into a third mode by applying a third display setting corresponding to a third genre to the image when the range of change of the vertical frequency for the preset time is as wide as a third preset range, the third preset range being wider than the second preset range.

* * * * *